April 30, 1929.  D. S. YOUNG  1,711,217
LINE POLE AND METHOD OF CONSTRUCTING SAME
Filed Dec. 27, 1926   2 Sheets-Sheet 1
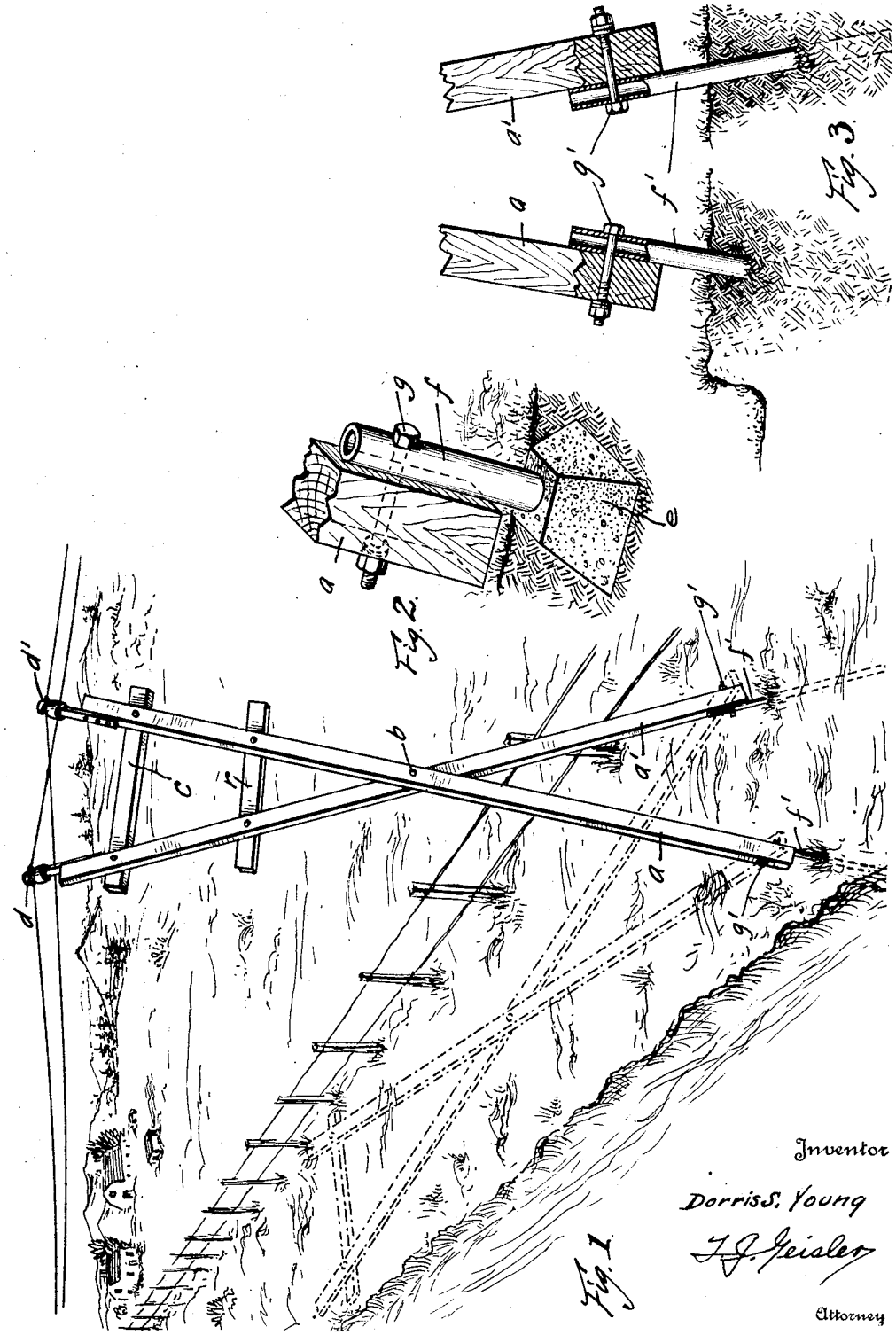
Inventor
Dorris S. Young
T. J. Geisler
Attorney

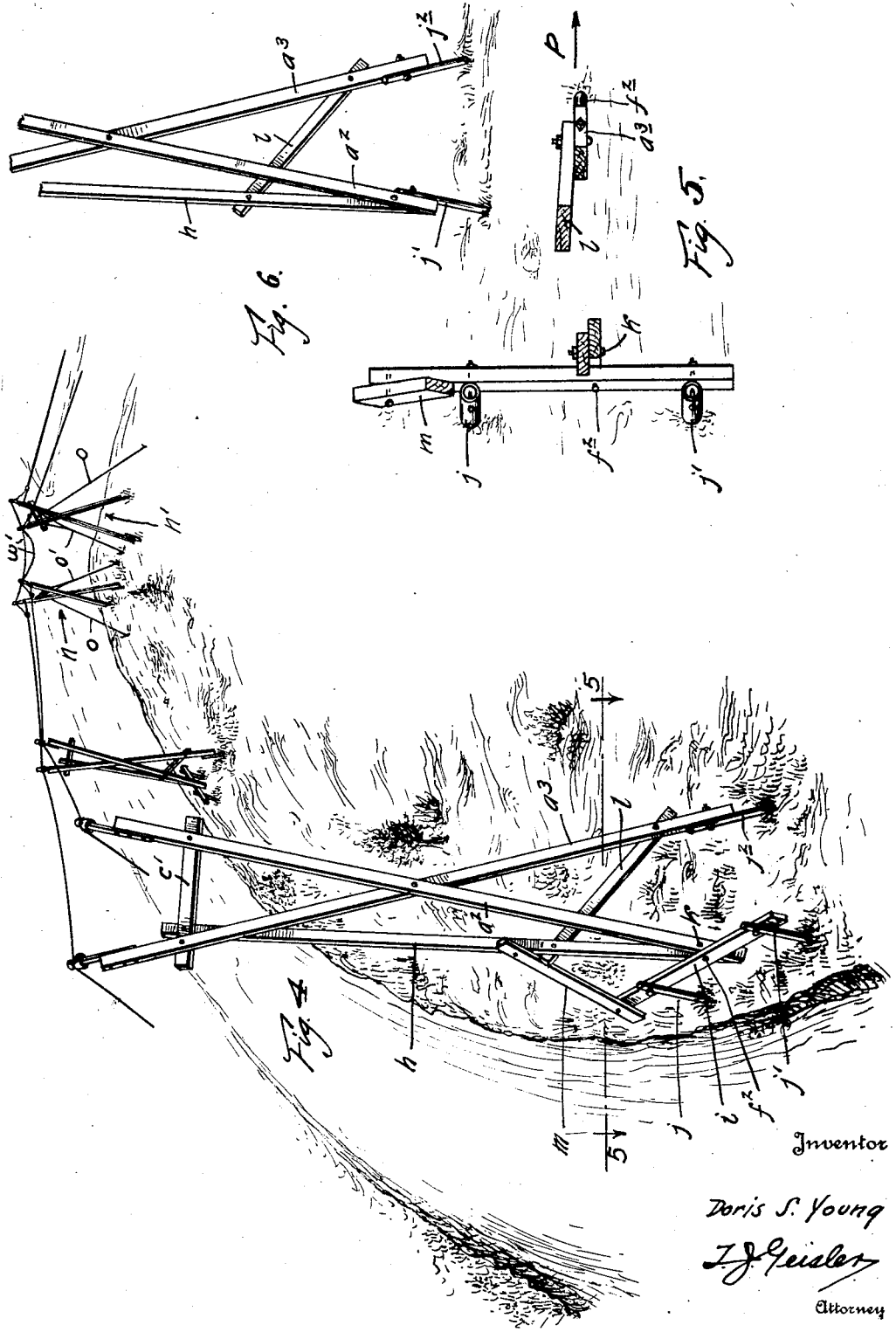

Patented Apr. 30, 1929.

1,711,217

UNITED STATES PATENT OFFICE.

DORRIS S. YOUNG, OF WILSONVILLE, OREGON.

LINE POLE AND METHOD OF CONSTRUCTING SAME.

Application filed December 27, 1926. Serial No. 157,257.

My invention relates to line-poles such as used for supporting telephone or telegraph wires, and the like.

The object of my invention is to provide an inexpensive pole which may be built from material readily obtainable at any locality; for example, from pieces of 2 x 4 lumber; and which may be standardized so that the elements of the component parts of the line-pole are of standard sizes suitable for all situations. Thus the pole may be shipped "knocked down" to any place from a central point, if more convenient to do so.

A further object of my invention is to provide a line-pole which may be readily put together on the spot where to be erected, and which is so arranged that in case of the pole falling to the ground, it will not tend to fall across the roadway, and block or constitute a menace to traffic, but instead will tend to fall on the line's own right-of-way clear of the roadway.

Another important purpose of my invention is to support my line-pole pivotally on its base, so that in case of a break in the line, the unit of poles adjacent the break will tend to fall to the ground, and thus bring the broken ends of the line in touch with the ground, and cause a short circuit which would blow out the fuses at the power house and thus break the circuit; in that way eliminating the danger which attends persons or animals coming in contact with the broken end of a line charged with electricity, supported off the ground.

I attain the latter results by providing a series of poles and pivotally supporting the basal end of each pole on an anchoring element or support fixed in the ground, with the pivotal axis arranged transversely of the direction in which the line extends, in other words the right-of-way; the line serving to hold the pole in upright position, and thus when the line breaks, the weight on either side of the break would tend to pull the poles over onto the ground in one direction or the other on the line's own right-of-way.

The same construction also gives flexibility to the line, and relieves it of undue strains. For instance, if the line is rather taut, the weight of ice clinging to it in the winter time imposes a severe strain, tending to break the line. But by my improved method and pole construction the strain may be relieved at the dead end anchors, so as to permit the poles, or a unit thereof, to tilt slightly in one direction or the other, thus permitting the line to sag sufficiently between the poles to relieve undue strain.

Other features of my invention will be brought out in describing the details of its construction and arrangement with reference to the accompanying drawings, in which:

Fig. 1 shows a perspective elevation of my line pole, of the type used for supporting the wires extended substantially along a straight course;

Figs. 2 and 3 show details of construction of variable anchoring elements on which the basal ends of the members of my line pole are pivotally mounted;

Fig. 4 is a perspective elevation of my line pole as modified for carrying the wires around a curved course more or less abrupt;

Fig. 5 is a plan sectional detail relating to the construction of my line pole as shown in Fig. 4 the section being indicated by the line 5—5;

Fig. 6 shows a perspective elevation, a modification in construction whereby a pole is used to carry the line around a slight curve in its course.

Referring first to Fig. 1; my line pole is composed of two pole sticks or members $a$, $a'$, bolted together as at $b$, intermediate their ends. The upper end of the members $a$, $a'$ are connected by an upper cross-piece $c$, and to these upper ends are fastened the insulated wire-carrying arms $d$, $d'$.

The lower or basal ends of the pole members $a$, $a'$ are pivotally supported on anchoring elements, of which two types are shown by Figs. 2 and 3. In Fig. 2 the anchoring element consists of a block of concrete $e$, supporting a post $f$ to which the lower or basal end of the pole-member $a$ is pivotally fastened by a bolt $g$. This construction is preferred by me, because it permits the basal ends of the members of the line pole to be firmly supported under all conditions of the ground; also permits the concrete block or base $e$ of this anchoring element to be firmly set in the ground at such angle that the post $f$ carried thereby will aline with the angle at which the related pole-member must be arranged with respect to the ground. But otherwise the anchoring element may consist merely of posts as shown by $f'$ in Fig. 3, to which the pole-members $a$, $a'$ are pivotally fastened by bolts $g'$.

In other words, an anchoring element consisting of a concrete block supporting a post, (the latter consisting of a pipe or angle iron) is best, because the concrete block can be so set as to bring the post into proper alinement with the pole stick; while an anchoring element, consisting of a mere post driven into the ground would not lend itself readily to adjustment.

Where the line must be lead around a curve, in the course, my line-pole must be modified so as to be strengthened, in the following manner;

Where the turn or curve is slight, it will be sufficient that the lower end of one pole-member be tied to the upper end of the complementary pole member by a supplemental member $h$ included in the construction illustrated in Fig. 6. The lower or basal end of the pole-member $a^2$ is connected by a supplemental member $h$ with the upper end of the complementary pole member $a^3$, as shown in Fig. 4; the connection of the upper end of the supplemental-member $h$ with the upper end of the pole-member $a^3$ may be made as convenient. As shown in Fig. 4, the upper end of the supplemental member $h$ is fastened to the top cross-piece $c'$.

Where, however, the turn or curve is more abrupt and tends to exert a heavier pull on the line, in the direction straightening the line, then the construction shown in Fig. 4 in all its details is preferred by me.

In this event the lower or basal ends of the pole-member $a^2$ and the supplemental member $h$ are connected to a basal cross-piece $i$, supported by two spaced posts $j$ and $j'$, to which the lower or basal end of the pole-member $a^2$ is pivotally connected by a bolt $f^2$; and the lower end of the supplemental member $h$ is bolted, as at $k$, to the lower end of the post-member $a^2$. A supplemental diagonal brace-bar $m$ connects the basal cross-piece $i$ with the lower end of the supplemental-member $h$; and the lower end of the supplemental-member $h$ and of the pole-member farthest from it, thus $a^3$, are connected by a diagonal brace-bar 1. The parts are preferably arranged as illustrated by Fig. 4, which as mentioned, is especially adapted to sustain a heavy lateral pull on the line, such as may be imposed in rounding an abrupt curve in the right-of-way. This pull would tend to be in the direction indicated by the arrow $p$ in Fig. 5; but before it could pull my line-pole over, it would have to pull out of the ground the posts $j$ and $j'$, and besides pull over the post $f^2$, supporting the post member $a^3$. In other words the construction shown by Fig. 4 provides a line-pole adapted to resist any tendency of the line to pull the line-poles over.

The brace-bar 1 is also included in the construction of my line-pole where used to carry the wires around a slight curve, shown by Fig. 6.

Where my line-pole is erected at a dead end or, at a place where the two sections of the line make an abrupt angle with each other, the construction may be as represented by $n$ and $n'$ in the upper portion of Fig. 4. The poles $n$ and $n'$ may be of the same construction as that illustrated in Fig. 1. The line-poles are braced on opposite sides by guy-wires $o$ and $o'$, and the line-wires $w'$ between the posts $n, n'$, are preferably arranged slack, so that there will be no tendency of these line wires to exert a pull from one to the other of the line-poles $n$ and $n'$.

The pivotal axis of my line-pole in any construction is so arranged as to be transverse of the direction of the line or of its right-of-way. Thus in case of a break in the line, the weight and pull of the unbroken portion of the line would tend to cause my line-pole to fall down on the ground in the right-of-way of the line, as illustrated by broken outlines in Fig. 1.

As evident from the foregoing description, my invention facilitates the building of an inexpensive line across more or less open country. My poles may be put together on the ground, the pole members $a, a'$, cut to suitable lengths, and the wires fastened to the poles; and then the latter lifted to upright position. In this way substantially all climbing of the pole is eliminated, and in consequence the time consumed in the construction of the line, and the cost thereof, is materially reduced.

My invention will also be found convenient as a support for an aerial wire.

As above mentioned, I prefer to use a concrete block as the anchoring base of my pole; because such block provides a much more stable support. Take for instance, where my pole constitutes a dead-end in the line, or carries a transformer, the weight imposed would cause a mere post or pipe to sink gradually into the ground, while the broad base of the block would prevent such result.

Where my pole is to be used for supporting a transformer another cross-bar is added as shown by $r$ in Fig. 1. The transformer is then hung from the bars $c, r$, in the usual way; and the advantage offered by my construction is the transformer may be moved to one or the other side of the medial vertical line, to take care of any lateral strains in the line occasioned by service drops.

In practice I find it convenient to drill the holes through the posts $f$ and the sticks or pole members, $a, a'$ by a drill set perpendicular to the longitudinal axis of said parts, and making the hole large enough, so that there will be sufficient looseness in the pole pivot-bolts $g$ or $g'$ as to permit the pole to hinge on an axis approximately horizontal.

I claim:

1. A line-pole comprising two complementary members arranged cross-wise and fastened together intermediate their ends, in combination with an anchoring element, means pivotally securing the basal ends of said members to said anchoring element, with the pivotal axis arranged transversely of the direction in which the line carried by the pole extends, a cross-piece tying the upper ends of said members together and a supplemental member connecting the basal end of one of said members with the upper end of the other of said members.

2. A line-pole comprising two complementary members arranged cross-wise and fastened together intermediate their ends, in combination with an anchoring element, means pivotally securing the basal ends of said members to said anchoring element, with the pivotal axis arranged transversely of the direction in which the line carried by the pole extends, a cross-piece tying the upper ends of said members together, a supplemental member connecting the basal end of one of said members with the upper end of the other of said members and a diagonal brace-bar connecting the lower end of said supplemental member with the lower end of that one of said complementary members spaced farthest from said supplementary member.

3. An over-head line carrier comprising a series of line poles which comprise two complementary members arranged cross-wise, and fastened together intermediate their ends, a cross-piece tying the upper ends of said members together, in combination with a corresponding series of supports fixed in the ground, and means pivotally securing the basal ends of said members to said supports close to the ground with the pivotal axes arranged transversely of the course over which the line carried by the line-poles extends, the line supported by the line-poles being connected thereto and serving to hold them in upright position while the line is unbroken.

DORRIS S. YOUNG.